United States Patent [19]

Hankins

[11] 4,051,900
[45] Oct. 4, 1977

[54] PROPPING MATERIAL FOR HYDRAULIC FRACTURING

[76] Inventor: Dale Hankins, 243 Irene St., Bakersfield, Calif. 93305

[21] Appl. No.: 690,147

[22] Filed: May 26, 1976

Related U.S. Application Data

[63] Continuation-in-part of Ser. No. 479,134, June 13, 1974, abandoned.

[51] Int. Cl.² .................. E21B 43/04; E21B 43/26
[52] U.S. Cl. .................... 166/250; 166/280; 166/278
[58] Field of Search .......... 166/278, 51, 280, 308, 166/250; 106/288 B, 309

[56] References Cited

U.S. PATENT DOCUMENTS

| | | | |
|---|---|---|---|
| 2,171,884 | 9/1939 | McLaine | 166/278 |
| 2,774,431 | 12/1956 | Sherborne | 166/280 |
| 2,905,245 | 9/1959 | De Priester | 166/278 X |
| 2,952,318 | 9/1960 | Ritch | 166/280 X |
| 3,434,540 | 3/1969 | Stein | 166/278 X |
| 3,670,817 | 6/1972 | Saucier | 166/278 X |

Primary Examiner—Stephen J. Novosad
Attorney, Agent, or Firm—Whann & McManigal

[57] ABSTRACT

A method of manufacturing a high permeability granular material, which is advantageously useful in hydraulic fracturing operations for completing new wells or stimulating older wells which produce oil, gas or other fluids by appropriate sizing and mixing of natural or manufactured particles in a manner such that the material will, when used in a proppant layer, retain its permeability with respect to contacting or surrounding natural soils or geologic formations containing fines capable of plugging conventional permeable materials, when such fines are moved by gravity or fluid flow forces.

7 Claims, 5 Drawing Figures

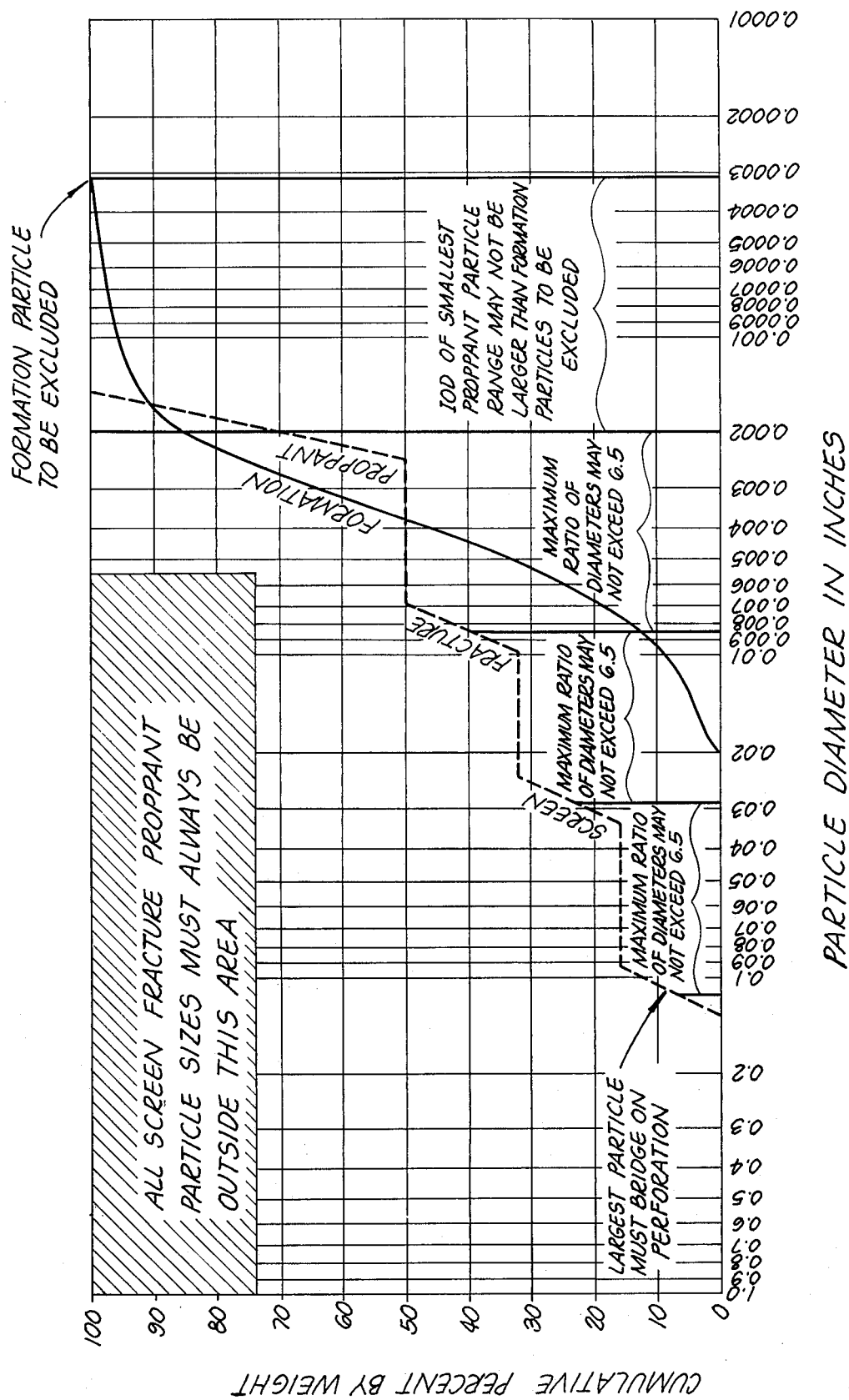

PROPPING MATERIAL FOR HYDRAULIC FRACTURING

This Application is a continuation-in-part of my pending prior Application Ser. No. 479,134, filed June 13, 1974 now abandoned.

BACKGROUND OF THE INVENTION

The present invention relates generally to the field of hydraulic fracturing.

"Hydraulic fracturing" is the name of a commonly used oilfield operation, and it consists of the forcing of fluid-particle mixtures into the well pipe at high pressures and rates. This fluid-particle mixture travels down the pipe and into the oil or gas producing earth formation through appropriate openings in the form of perforations, or the like, in the well pipe. Technical data obtained from a large number of hydraulic fracturing operations have proven that earth formations tend to part or split, when fluids at high pressure and rates are pumped into them. The mixture of liquid and particles travels into the split or "fracture" as it is called. When pumping is halted and some of the fluid from the fluid-particle mixture "bleeds-off" or migrates to the formation, the formation split closes until it touches the particles. The particles remaining in the fracture, if properly designed, can prevent the split or fracture from completely closing. These remaining particles are herein referred to as "the proppant layer". Its function is to provide a layer of particles through which formation fluids will more easily flow to the wellbore, and thence flow or be artificially lifted or pumped to the surface. The hydraulic fracturing process has been used successfully heretofore to stimulate oil and gas production from thousands of wells, since the beginning of its general usage in the 1950's. The process has proved to be successful in many formations; however, only those formations which have certain characteristics have been profitably fractured. In general, economic stimulation by fracturing has occurred mainly in the harder formations, and softer formations have rarely been effectively stimulated. Large numbers of hydraulic fracturing treatments have been performed on wells completed from softer formations, and a high percentage of failures has occurred in spite of the successful displacement of the fluid-particles mix into the formation. In hard formations, effective stimulation has been achieved both with proppant layers which are "packed" and those which are "monolayered". A packed proppant layer is one in which the proppant layer, when in place, consists of several thicknesses of particles, while a monolayered proppant is one in which the proppant layer is only a single particle in thickness. Monolayers are effective in hard formations for the reason that the sides of the formation split are hard, and relatively few particles are capable of holding the split open. In contrast, a soft formation split cannot be held open by a monolayer because the proppant particles penetrate into the soft unconsolidated walls of the formation, when the split is closed by overburden effects. This action can completely close a formation split. For this reason, efforts to stimulate unconsolidated formations in general have been oriented to packed proppant layers. Packed proppant layers are relatively thin and may range from perhaps a centimeter or two in thickness near the wellbore to a sand grain's thickness at their end. Over most of their length, they are at least several particles thick. When formation particles are stopped by outer particles of the proppant layer, the openings between the inner particles are available to flow fluids.

In spite of the theoretical feasibility of stimulation of softer formations by the placement of packed proppant layers, a high percentage of wells, which have been hydraulically fractured to achieve a packed proppant layer, have failed to stimulate production. Many of the wells whose production was stimulated were successful because of the removal of wellbore damage rather than effective functioning of the packed proppant layer. "Wellbore damage" is a term used to collectively account for reduction of formation flow capacity in the immediate vicinity (typically within a meter or less) of the well pipe perforations. Such damage can be caused by filling of the formation openings by particles or viscous fluids originating either in the formation, or from outside the formation such as the fluid used to drill the well. Sand laden, high velocity mixes of particles and fluid of hydraulic fracturing treatments are effective in removing formation damage. Stimulation of production from a treated well can occur even though the proppant layer is ineffective and incapable of transmitting formation fluids to the wellbore. It should be understood that removal of wellbore damage, while desirable, is no substitute for placement of an effective proppant layer. Removal of all wellbore damage can improve well productivity to the maximum natural productivity of the formation; while in contrast, an effective proppant layer will improve well productivity to several times the maximum natural productivity of the formation. Failure of proppant layers to provide permeable paths to the wellbores in softer formations has been technically perplexing and has limited economic recovery from lower productivity softer formations.

Formations which contain valuable fluids in their pore spaces vary widely in their character. They range from very hard formations, such as limestones and sandstones whose particles are cemented, i.e., firmly held together by natural binders, to softer sandstones and unconsolidated sands whose grains are weakly cemented or completely uncemented.

Many factors in the formation (mechanisms) are of significance with respect to hydraulic fracturing. Two significant ones are overburden pressure and temperature. High pressure and temperature acting at deeper depths cause formations to perform differently than at shallow depths where temperature and pressure effects are low. Formation temperature and confining formation pressure, in addition to gravity forces, contribute materially to the ability of the formation particles to move, particularly when fluids are moving through the formation. Movement of an individual particle in the formation changes the contact points and forces holding the surrounding particles in place. These particles are free to shift and move until they reach a new, more stable arrangement. In this manner a shifting of particles occurs which makes unconsolidated formations behave in a plastic manner. At deeper depths, higher temperature and confining pressure increase the ability of formation particles to move. For this reason, the term "softer formations" as used in the description of this invention, is a relative one. A formation at low overburden pressure and temperature might be successfully stimulated by a hydraulic fracturing treatment designed for hard formations. The same formation buried deeply, where overburden pressure and formation temperature are sufficiently high, could not be stimulated by the same treatment. When a formation behaves plastically, it is considered a softer formation from a hydraulic fracturing point of view, because its particles can gradually move.

Softer formations capable of producing gas, oil, or other liquids are usually composed of sand sized particles and lesser amounts of other particles; silt sized particles of various minerals and clay particles being most common. The presence of these small particles reduces permeability because they occupy the openings which would otherwise be available for fluid flow. When the small particles are present in substantial percentages, permeability is significantly reduced. Also, in some formations the smaller particles are very mobile and readily migrate through the openings between the particles comprising the formation. When these small particles move to the vicinity of the wellbore, they may collect to cause an area of restricted permeability around the well. In some otherwise permeable formations, this severe productivity restriction, called wellbore damage, can occur a few hours after production starts; while in others, it may occur gradually over several months or several years. Formations with restricted permeability or those damaged by mobile small particles are in need of the increased productivity which can be provided by successful hydraulic fracturing. Yet it is these formations which contain large numbers of the small particles capable of invading a proppant layer and destroying its permeability.

Applicant has determined from extensive laboratory tests of unconsolidated sands containing small particles, that the small particles do move into a proppant layer containing particles such as heretofore used in hydraulic fracturing. Small formation particles will therefore tend to move through openings, when subjected to the force of moving well fluid, unless they wedge or bridge on the openings. "Wedging" is herein defined as the condition which exists when a particle does not pass through an opening because it is larger than the opening. "Bridging" is the mechanism which exists when a particle does not pass through an opening larger than it is, due to interaction with one or more other particles smaller than the opening. Bridging is effected when moving particles touch and become immobilized in a configuration which withstands forces affecting the particles.

Bridging can occur between the first particles which encounter an opening; but it is normal for some particles to pass before bridging occurs. The number of particles which pass into a proppant layer before briding occurs depends on the shapes of the openings between the proppant particles and the shapes of the small formation particles. If a proppant layer is thin, passage of relatively few formation particles into its center will sharply reduce its permeability. A proppant layer, which passes large numbers of formation particles, also experiences wellbore damage when the formation particles collect in the vicinity of the wellbore. For these reasons, halting of formation particles at the proppant layer-formation boundary by wedging rather than bridging, is necessary for optimum hydraulic fracturing of softer formations.

"Screen Fracture Proppant" (abbreviated SFP) as used herein, relates to the concept and method of providing a particle mix which screens or excludes formation particles as a function of the size of the openings between its particles. Screen Fracture Proppants differ markedly from the proppants heretofore used in fracturing operations. Conventional proppant systems are constructed to maximize permeability. Large particles possess higher permeability than small particles; consequently, conventional proppants usually consist of one or two particles whose size is large in relation to the small formation particles in the formation. In contrast, SFP, according to the present invention, usually consists of several particles each larger than the next smaller particle by a specified ratio of diameter. The SFP is constructed so that the size of all its openings are equivalent to those of the smallest particles in the mix, even when these are large particles in the mix. The size of these small openings between particles of a SFP are directly related to the size of the smallest particles contained in the formation. No other proppant particle system or concept is sized in this manner.

In contrast to the SFP concept above, U.S. Pat. No. 2,905,245, dated Sept. 22, 1959, discloses a method of packing the annular space between a liner and an unconsolidated sand formation containing a fluid by positioning a widely-graded sand pack, generally referred to as a gravel packing mix, having a distribution of sand particles substantially similar to the size distribution of particles in the formation, but each selected particle of the distributed pack having a diameter several times the diameter of the particle in the original formation to which it corresponds. While this patent uses a mixture of particles, the particle size selection is not made on the same basis as in the present invention.

More specifically, the method of this patent specifies a mix of gravel pack particles of a diameter no larger than eight times the diameter of formation particles at the 50 cumulative weight percent point, and no larger than twelve times the diameter of formation particles at the 90 cumulative weight percent point. It also specifies that the different sizes of pack particles should be present in approximately the same weight percentage as the corresponding formation size. For a pack particle no more than twelve times the size of the formation particle at the 90 percent cumulative point, the pack particle would consist of approximately 10 percent of the total mix.

The quantity of smallest particles in a mix to be used for fracturing must be present in much larger amounts than the ten percent specified in the graded sand pack method of this patent. SFP specifies 26 percent or more of the smallest particles and typically uses 45 to 75 percent. The graded pack will not adequately exclude the small particles of a formation, even if the quantity of its smallest particles are more than 26 percent, because the openings between its particles are too large. The use of pack particles that are twelve times the diameter of the formation particles at the 50 percent cumulative weight point is a satisfactory gravel packing design, but is unsatisfactory for fracturing proppant designs because its openings are excessively large. No relationship at the 90 percent cumulative weight point between the pack and formation particles according to the foregoing patent is satisfactory for compounding fracturing proppants. I have determined that the smallest particles of SFP mixes are very commonly smaller than the formation particles themselves at the 90 percent cumulative weight point.

A proppant layer constructed according to SFP specifications as outlined in the present invention possesses the highest possible permeability of any mix with openings sized to exclude, by wedging, a specific size of formation particle. SFP also can possess interwedging capability between its particles, a property no other system possesses.

SUMMARY OF THE INVENTION

The present invention relates more specifically to an improved method for the manufacture of a high permeability granular material for use in hydraulic fracturing operations to provide a proppant which can be pumped into the formation to provide a packed proppant layer which will retain high permeability when surrounded by unconsolidated or partially consolidated formation material.

One objective of the present invention is to provide an improved packed proppant layer in a hydraulic fracture operation, in which the particles are so sized as to provide a high degree of permeability, and which will positively stop small formation particles from entering the pores of the particles forming the proppant layer.

A further object and feature is to provide a proppant layer which will exclude, by wedging, any selected size or percentages of formation particles at its boundary.

Another object resides in the provision of a proppant layer which is capable of forming a stable bridge on the well pipe openings or perforations, and which will result in the smallest possible production and movement of proppant particles into the well.

The innovative system of the present invention which fulfills these objects and features is based on the Screen Fracture Proppant concept, and utilizes a mix of particles of specific size relationships to both formation particle size and perforation size that is formulated according to the present invention. This mix is displaced down the well in an intimately mixed slurry form in a liquid carrier, and high pressure, high volume pumps are utilized to transmit the fluid-particle mix into a hydraulically formed fracture. When properly placed in the fracture as a proppant layer, it provides a layer with high permeability with respect to the formation, and fine formation particles capable of reducing its permeability are prevented from entering its openings.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 5 is a logarithmic plot similar to that of FIG. 1, but additionally showing the distinctive characteristics of the Screen Fracture Proppant concept.

DETAILED DESCRIPTION OF THE INVENTION

Figure 1:
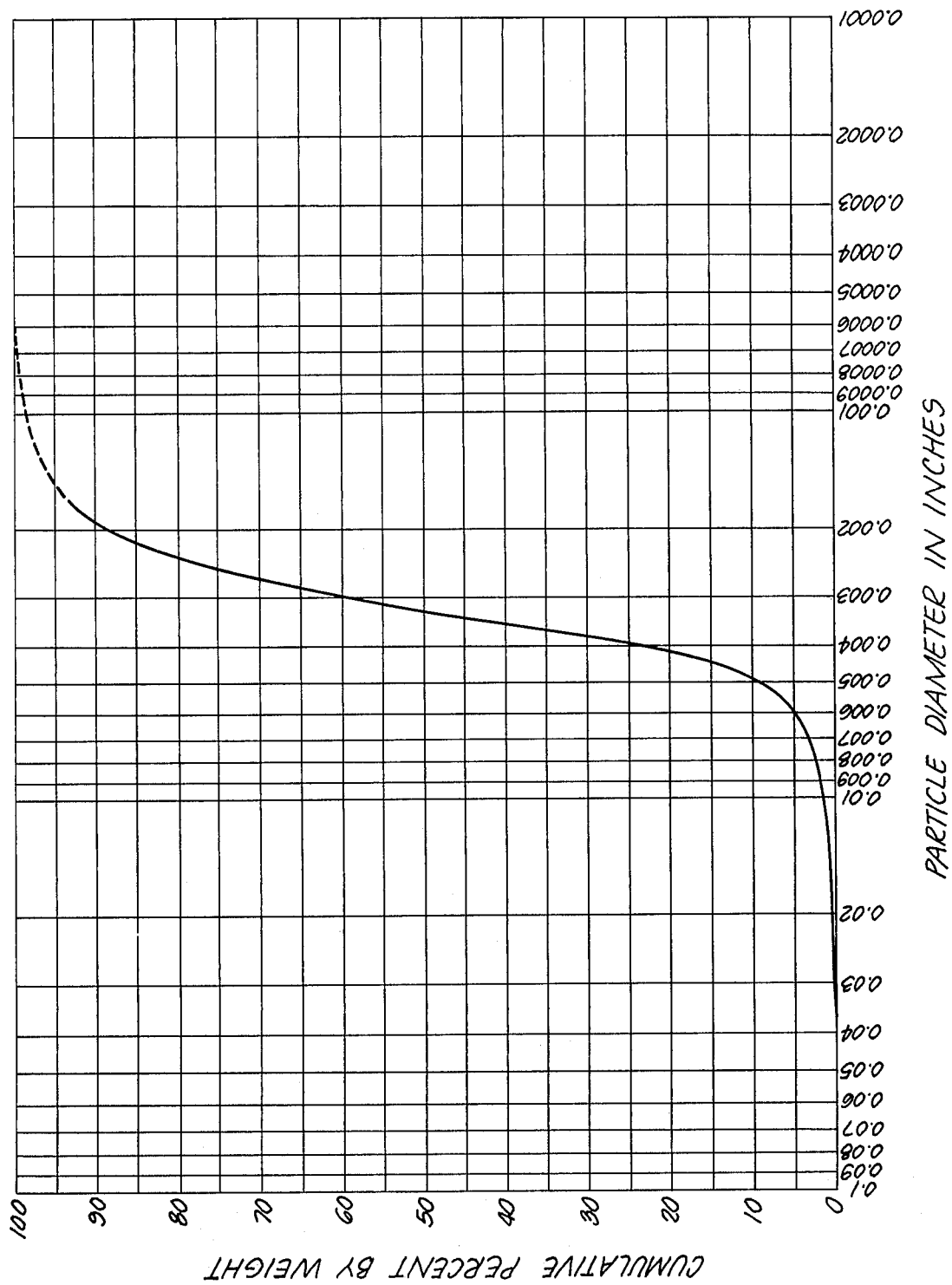
FIG. 1 is a logarithmic plot showing Cumulative Percent by Weight in relation to the Particle Diameter in Inches.

The first step in carrying out the present invention involves a determination of particle size distribution of the particular formation. Formation samples can be obtained by any one of several acceptable procedures such as coring, side wall sampling, or analysis of drilling fluid returns. These samples are most commonly separated by size using test screens such as Tyler or U.S. Screens. The most common method of determining the particles size distribution is to plot test screen data as illustrated in FIG. 1, which shows Cumulative Percentage By Weight of the particles versus Particle Size, on a log scale, as the ordinates. The smallest test screen available is a 400 US Sieve. Most formations contain significant quantities of particles smaller than the openings of a 400 US Sieve screen. Other methods are available for measuring the particles smaller than 400 sieve, but few formation samples have been quantitatively analyzed for such small sized particles. When formation size data, smaller than 400 sieve, are not available, it is often possible to project data beyond the smaller than 400 sieve size, since the particle size distribution changes gradually in most formations. The dotted portion of the curve in FIG. 1 illustrates such a projection.

Figure 2:
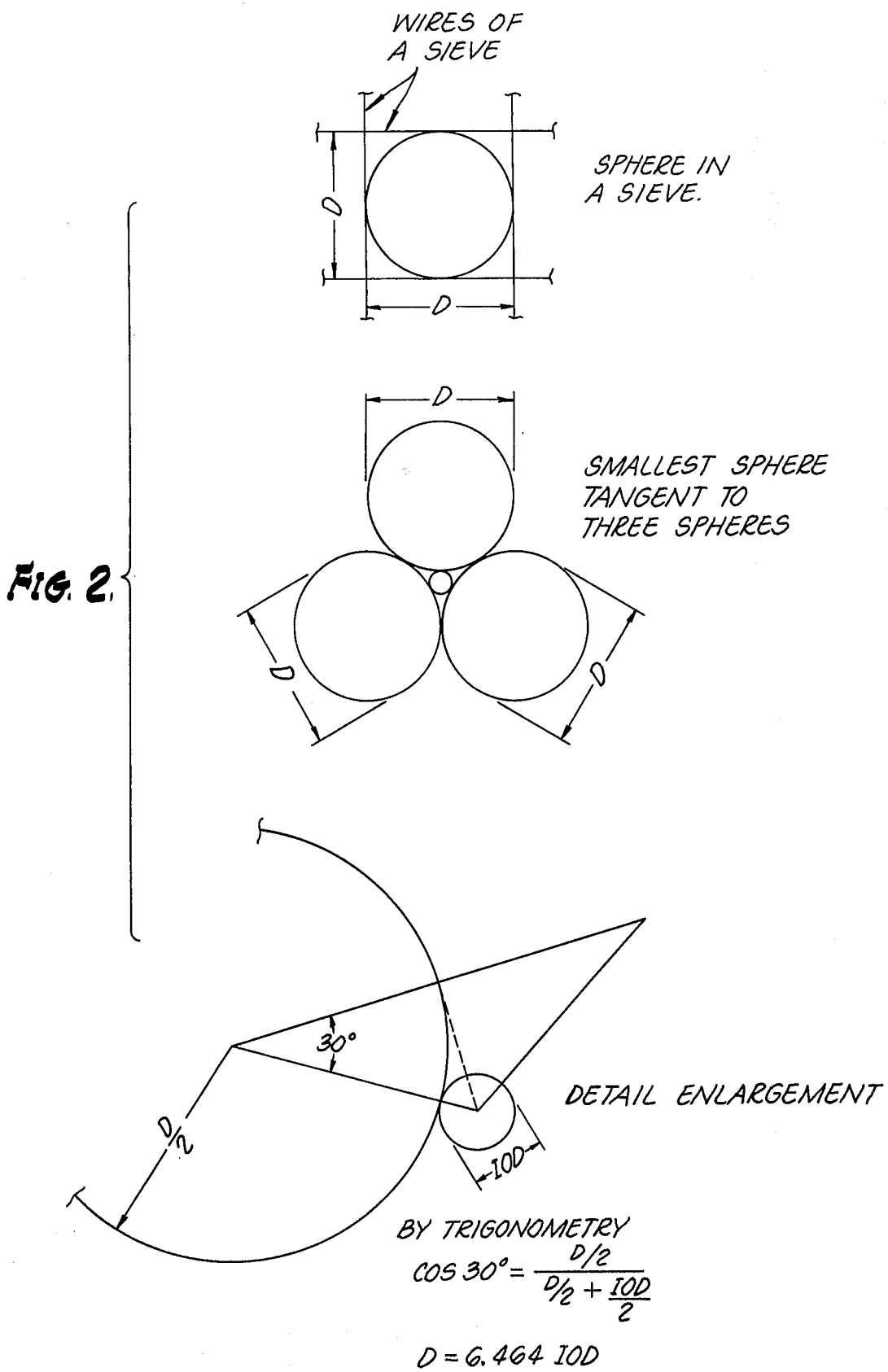
FIG. 2 diagrammatically illustrates the mathematical derivation of the intergrain opening diameter for spherical grain particles, according to the present invention.

The second step in the SFP process consists in the determination of the proppant layer opening which will effectively exclude the desired formation particle sizes. Maximum diameter of the openings of a SFP proppant layer is specifically limited to 0.001 inches or 25 microns. Openings of this size or smaller are capable of excluding particles which can severely damage a proppant layer because of their low permeability. Larger openings exclude only particles large enough to possess moderate permeability and do not exclude smaller particles capable of damaging the proppant because of their low permeability. The sizes of the openings are usually much smaller than 0.001 inch or 25 microns because it is normal procedure to design SFP to exclude substantially more than 99 percent, and often more than 99.99 percent by weight of the formation particles. When formation particle size data in this range are available, the percentage of the total formation particles which will be excluded by exclusion of a particular formation particle size can be determined. Factors considered in determination of First (smallest) particle size, which posses openings of the particular size to exclude desired formation particles, can be best explained by reference to FIG. 2, which discloses the trigonometric relationship involved in the wedging of the smallest possible sphere on three larger spheres of the same size. The diameter of this smallest sphere is referred to herein as the "Integrain Opening Diameter" and is abbreviated IOD. Pictorial representation of IOD appears in FIG. 2, and the IOD for various particle sizes is tabulated in the subsequently noted Table 1. These relationships demonstrate that, for wedging, the diameter of spheres is 6.464 times their Integrain Opening Diameter. For simplicity, the figure 6.464 as used herein is taken as 6.5. Erratically shaped particles, whose maximum diameter is equal to that of spheres, possess average openings of a size approximately equal to that of spheres, and shapes of openings of non-spherical particles are more variable so some of the openings will be found to be larger than predicted by spherical particle relationships.

An important objective of SFP according to the present invention, resides in the placement of a proppant layer which excludes particles of any selected size, so size determination based on spherical particle calculations are maximum ones. Maximum diameter of First (smallest) SFP particle size is determined by multiplying the diameter of formation particle to be excluded by 6.5. Actual ratios used will often be slightly reduced - to the 5 to 6.5 range. Reduction of First (smallest) SFP particle size ratio assures absolute exclusion of the desired size formation particles with limited loss of permeability. As the ratio is reduced, permeability does decrease. Loss of permeability of the proppant layer resulting from decreasing of the ratio from 6.5 to 6 is about 6 percent; loss by decreasing from 6.5 to 5 is about 30 percent. Effect on well stimulations by reduction of proppant permeability by these amounts is not severe. Example 1, as hereinafter noted, includes calculations of production stimulation from two proppants of different permeability.

SFP usually contains two, three, or four particle sizes. There are two applications in which SFP consists of a single particle size. One application requires addition of a cement to bind the particles together in the vicinity of the pipe perforations so that the fluid flow forces cannot move the proppant particles into the well. The other single particle size application is for pipe perforations which are of such small size that the particles will form stable bridges of them.

Years of experience in industry have verified that stable bridging of particles on slots consistently occurs when particles are at least one half the diameter of the slot. Particles will form a stable bridge on round holes, when they are at least one third the diameter of the hole. Stable bridges on holes larger than these ranges are possible, when the particle shapes are irregular. A slot diameter to bridging particle diameter ratio of 2, and perforation hole diameter to bridging particle diameter ratio of 3, respectively, are used for SFP design; but it is recognized of course that bridging does occur outside these ratios in some cases. Bridging outside of the known conservative ranges are of limited interest in SFP design for the reason that any removal of SFP particles from the critical area next to the well casing sharply reduces productivity of the well.

Two-particle SFP mixes are prepared by combining a quantity of larger particles of Second size particles to First (smallest) size particles. First (smallest) particle sizing has been described previously. It is the same for any number of particle mixes. Both percentage and size of the Second particle are specifically defined, and are dependent upon the volume and size of the First (smallest) particle.

The basic objective of the SFP process in which the proppant layer excludes formation particle of any selected size, is attained by control of the size of openings between First (smallest) particles. When all the area between the Second particles is occupied by the First (smallest) particles, openings of the entire mix are the same as those of the First (smallest) particles alone. Maximum diameter of the Second particle of any SFP is limited to 6.5 times the diameter of First (smallest) particle to assure wedging. Wedging of First (smallest) particles in the openings between the Second particles bridged or wedged at the perforation assures the smallest possible production of SFP proppant particles into the well. In Two-particle mixes the largest particle must also provide bridging or wedging of the perforations. Bridging conditions for particles on perforations have been described previously.

SFP mixes of three or more particles are sized in the same manner as in the case of a two particle system. The First (smallest) particle size is determined from the size of the formation particle to be excluded. The maximum Second particle diameter is 6.5 times that of First (smallest) particle, and the maximum Third particle diameter is 6.5 times that of Second particle, and so on. The largest particle in the mix must also bridge or wedge on the perforation.

Relative amounts of the different size particles in a SFP mix can be varied within wide ranges so long as there is a sufficient quantity of the smallest particle to fill all the space between the larger particles. The quantity of the smallest particles in a SFP mix is specifically required to be greater than 26 percent by volume, because minimum porosity of tightly packed spherical particles is 25.95 percent, 26 percent being adopted in SFP claims for ease of description. Use of even higher percentages of First (smallest) particles improves the performance of SFP mixes. Field mixing, transport and pumping operations are imperfect and all contribute to some mixing unevenness. Use of only the minimum possible percentage of First (smallest) particles can result in areas of the proppant layer which are deficient in First (smallest) particles. Laboratory tests of two-particle SFP mixes have demonstrated that addition of First (smallest) particles above the amount necessary to fill the porosity between the larger particles increases the permeability of the SFP mix. This occurs for the reason that fluid flows through the openings between the small particles. As the volumetric percentage of small particles increase, the number of openings available for fluid flow increases. Addition of First (smallest) particles is beneficial for SEP mixes up to the point that bridging at the perforations is impaired due to lack of larger particles. Optimum volumetric percentage of First (smallest) particles in a SFP mix of two or more particles is in the 45% to 75% range, depending on the number of particle sizes in the mix and perforation bridging conditions.

The next step in the fracturing process, consists in the mixing of a suitable fluid with the SFP particles. Intimate mixing of the particles is critical to the SFP fracturing process. The intimate mix is best preserved by use of a fluid which is sufficiently viscous to prevent or inhibit separation of the large particles from the smaller ones both on the surface and while traveling down the well pipe. High ratios of solids to fluids are used to provide greatest stimulation by the deposit of a thick proppant layer in the formation split.

The last step of the fracturing process resides in the pumping of the SFP-fluid mix down the well pipe and into the formation split. High pumping rates and large quantities of SFP mix are used to create thick, long formation splits.

The process can be more thoroughly understood from the following example:

EXAMPLE 1: THE SCREEN FRACTURE PROPPANT

SFP particle sizes are calculated for the formation sand of FIG. 1. Comparison of expected production increase expected from hydraulic fracturing of the formation using two different SFP mixes is calculated.

The two mixes are separately evaluated in Part (a) and Part (b) of the example. Part (a) will evaluate a SFP mix designed to positively exclude 99 percent, by weight, of formation particles. Part (b) will evaluate a SFP mix designed to exclude substantially all (99.99%) of formation particles. The well is assumed to be producing 34 barrels per day of oil through 0.4 inch diameter perforations with negligible water and gas. Commercially available sands for fracturing use are assumed to be:

US SIEVE

4 - 5
5 - 6
6 - 8
8 - 12
12 - 20
20 - 30
30 - 40
40 - 60
60 - 80
80 - 100
100 - 140
140 - 230
230 - 400

PART (A) EXCLUSION OF 99% OF FORMATION PARTICLES:

Size of formation particle at the 99% Cumulative Percent By Weight from FIG. 1 is 0.00084 inch.

Intergrain Opening Diameter, approximately equal to 0.00084, is located in Table 1. 120 US Sieve particles have an IOD equal to 0.00076 inch. This particle has the desired opening for SFP use.

100-140 Sieve sand has an average opening size about that of 120 Sieve, so it will be acceptable for exclusion of 99% of formation particles. 100-140 is selected for First (smallest) SFP particle diameter.

Second SFP particle maximum diameter is calculated as 6.5 × 140 Sieve Diameter = 6.5 × 0.0041 inch = 0.0267 inch.

From Table 1. an IOD of 0.0232 inch corresponds to 30 sieve so 30-40 sieve sand will wedge 100-140 sieve particles. 30-40 is selected as Second SFP particle.

Bridging on the 0.4 inch diameter perforation will require particles one-third the diameter of the hole. 0.4 inch ÷ 3 = 0.133 inch diameter particles. 5-6 particles range from 0.132 inch to 0.157 inch in diameter and is ideal for bridging on the 0.4 inch perforations.

SFP mix is selected to be (by volume):

| | | |
|---|---|---|
| 20% | 5 - 6 | Sieve |
| 20% | 30 - 40 | |
| 60% | 100 - 140 | |

Percentages of each size could be varied within wide limits without destroying the ability of the mix to stimulate production. Most critical percentage is that of the First (smallest) particles. Unless there is a sufficient amount of these particles to completely fill the space between the larger particles, the proppant layer will not retain permeability. 26% is an absolute minimum for that proppant layer to have any possibility of long-lived permeability retention. SFP mixes specifically required more than 26% First (smallest) particles.

Size of the particles in the mix can usually be varied in only one direction. In particular, the First (smallest) particle has an upper diameter limit where it will function. By SFP specification the IOD of First (smallest) particle must be no longer than 0.001 inch or 25 microns. The First (smallest) particle is the most common one on a volumetric basis. Its characteristics dominate the performance of the SFP mix including openings between its particles and the permeability of the mix. Changing of size or quantity of the First (smallest) particle changes SFP performance. Change of the size of the larger particles or their relative amounts does not affect the mix until the wedging limits are violated or bridging at the perforation fails to occur.

The reason for repeating the relationships which affect SFP performance is to emphasize that there are other satisfactory mixes than the one used in Part (a), of this example, A four particle system which also satisfies SFP is presented in Part (b) of this example to emphasize this property of SFP.

Figure 3:
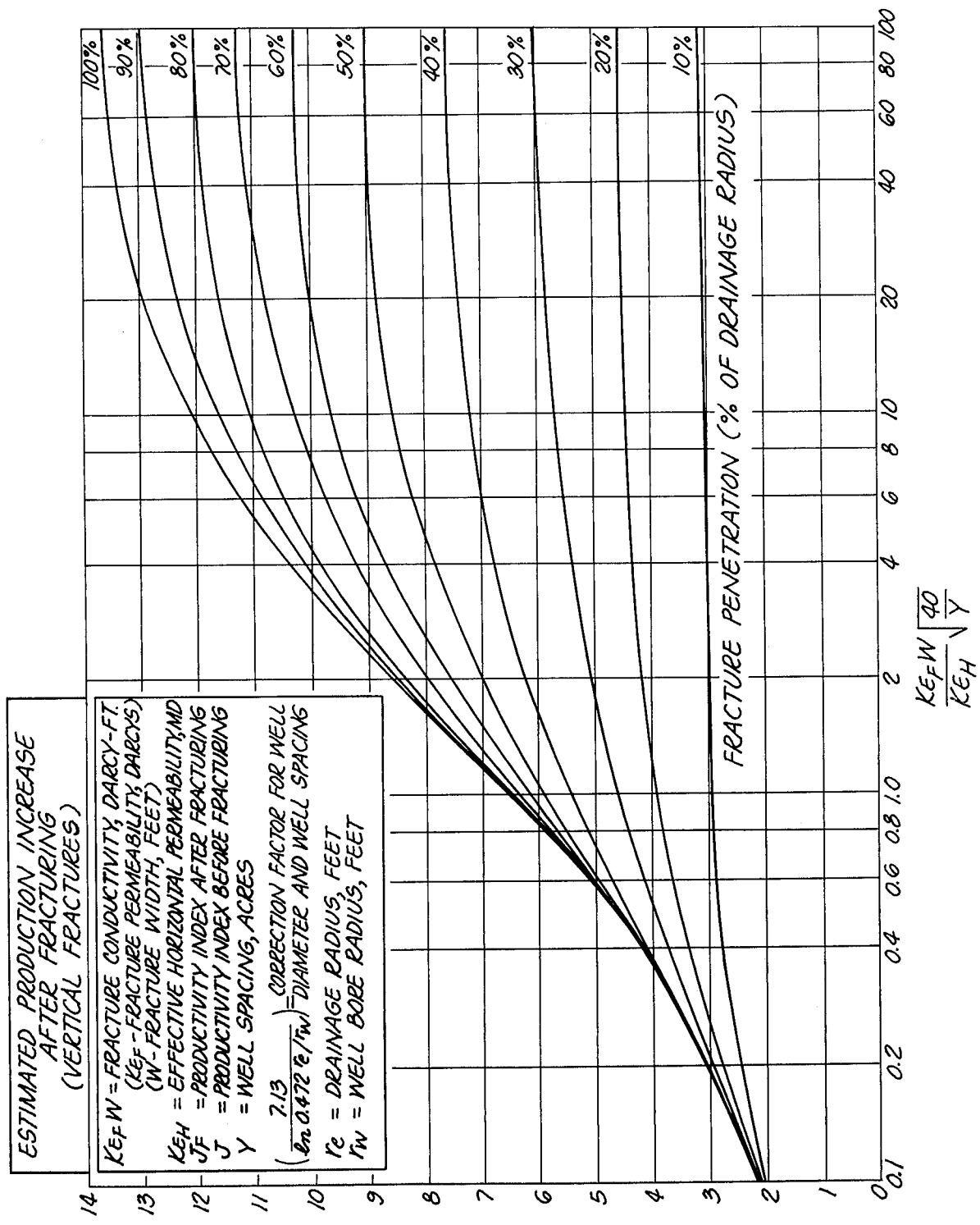
FIG. 3 is a graph showing productive increase as a function of well and fracture parameters.

FIG. 3 is one graph from which well stimulation resulting from hydraulic fracturing can be estimated. The graph has been used in the petroleum industry for this purpose for many years. It is included to demonstrate the SFP properties which are of special significance in hydraulic fracturing. Stimulation of the formation of FIG. 1 with a hydraulic fracture propped with the SFP mix of Part (a) can be determined by use of this graph. The evaluation requires a variety of input parameters.

These values are assumed as follows:
$KE_F$ = Proppant layer permeability, Darcys
$KE_H$ = Formation effective horizontal permeability, millidarcys = 0.3
W = Average proppant layer width, feet = 0.1
$J_F$ = Productivity index after fracturing (to be calculated)
J = Productivity index before fracturing = 34 barrels/day
Y = Well spacing, acres = 10
re = Drainage radius, feet = 330
rw = Well bore radius, feet = 0.5

Figure 4:
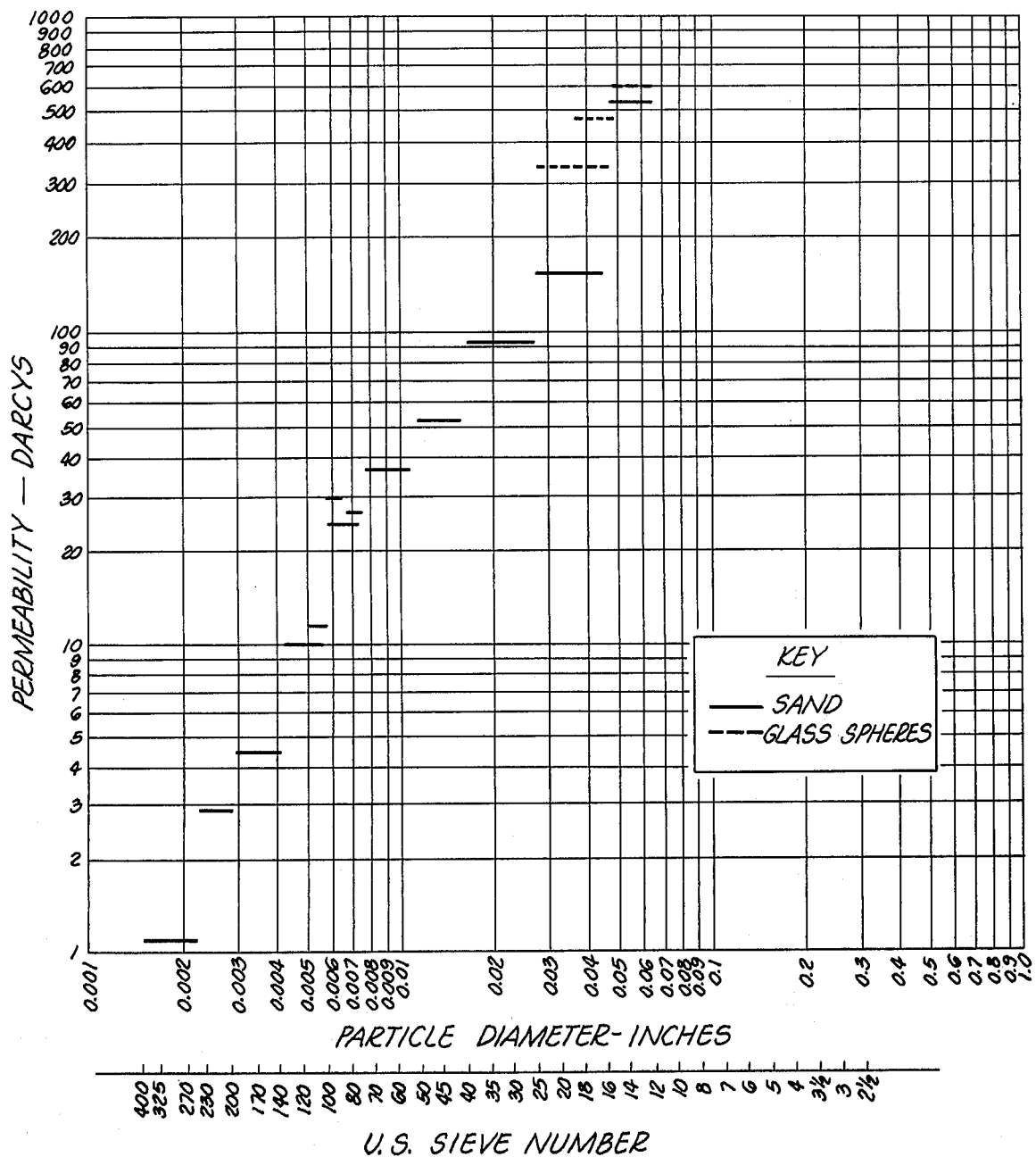
FIG. 4 is a graph showing permeability of uniform size grains as a function of grain diameter.

Permeability of the SFP layer must be determined. FIG. 4 is a log-log plot of Permeability in Darcys as ordinate versus Particle Diameter in inches and by US Sieve. Data of FIG. 4 is for narrow ranges of particles. Permeability of mixes containing two or more particles must be corrected for presence of the larger particles. From FIG. 4 permeability of 100-140 US Sieve sand is about 10 Darcys. Laboratory tests show that addition of 40% of larger particles will reduce the permeability of the mix to about 80% of the pure small sand. Permeability of the SFP mix is therefore estimated to be 8 Darcys. Stimulation from a nearly vertical fracture of 50 feet in radius is assumed; this equals 15% fracture penetration. Substitution of all of these values in FIG. 3 allows $J_F$, production after fracturing, to be calculated.

$J_F$ = 84 barrels/day

PART (B) EXCLUSION OF 99.99% OF FORMATION PARTICLES:

Diameter of the formation particle at 99.99 cumulative percent from FIG. 1 is 0.00055 inches. From Table 1. Intergrain Opening Diameter of 170 Sieve = 0.00054 inches. 170 Sieve is in the 140-230 range commercially available. Because of the wide range, it should be checked for effectiveness:

IOD of 140 = .00064" from Table 1
IOD of 230 = .00037" from Table 1
Average IOD = 0.00050"

IOD of 140-230 is smaller than the formation particle to be excluded, so 140-230 is satisfactory for First (smallest) particle.

Second particle maximum diameter = 6.5 × 230 Seive = 0.0024 inches × 6.5 = 0.0156 inches. From Table 1. 40-60 Sieve contains only a slight amount of particles larger than 0.0156 inches so it is satisfactory for Second SFP particle size.

Third particle maximum diameter = 6.5 × 60 Sieve = 6.5 × 0.0098 = 0.065. 12–20 mesh will hold 40–60 and is Third SFP particle.

Fourth particle must bridge on the 0.4 inch perforation. This size is calculated in Part (a) to be 5–6 Sieve.

| SFP mix is selected to be: | 18% | - | 5 – 6 |
|---|---|---|---|
| | 16% | - | 12 – 20 |
| | 16% | - | 40 – 60 |
| | 50% | - | 140 – 230 |

$J_F$ is calculated for the Part (b) mix using exactly the same values as in Part (a), except for $KE_F$, permeability of the SFP layer. From FIG. 4, permeability of 140–230 Sieve is estimated to be 3.5 Darcys. Permeability of the mix with larger particles is estimated to be 70% that of pure 140–230 Seive or 2.5 Darcys. From FIG. 3

$J_F$ = 65 barrels/day

Comparison of the calculated productivities after fracturing of Part (a) and Part (b) reveals that only a relatively small production gain is achieved by using 100–140 Sieve sand instead of smaller 140–230 Sieve sand for First (smallest) SFP size of this particular formation. Control of 99.99% + of formation particles by use of the smaller First (smallest) particle would be more likely to prevent future failure of the proppant layer.

This example demonstrates that SFP proppant layers containing openings between their particles significantly smaller than those of more conventional fracturing methods possess properties effective for fracturing.

EXAMPLE 2

A hypothetical further example using the formation with particle distribution represented by the curve labeled "Formation" on FIG. 5 will best demonstrate the distinctive characteristics of Screen Fracture Proppant. Other characteristics and design parameters shown on FIG. 5 will become apparent during the description of the SFP design according to this example.

The formation particle to be excluded by the proppant pack is selected to be 0.00031 inch in diameter. Exclusion of this particle will exclude 99.9 percent, or more, by weight, of all the particles in the formation. Positive exclusion of all particles larger than 0.0031 inch in diameter can be accomplished by a proppant pack with an Intergrain Opening Diameter of 0.0031 inch or less. Round particles whose diameters are 0.002 inches have IODs equal to 0.00031 inch because IOD times 6.5 equals the particle diameter D. Table 1 also lists IODS versus particle diameters. Spheres with diameters exactly equal to 0.002 inches would be prohibitively expensive for fracturing application. Even uniformly sized sand particles which were all equal in diameter to 0.002 inch would be very expensive. A narrow range of sand particles posses characteristics satisfactory for use as SFP constituents. These narrow ranges of particles can be segregated by commercial processes at relatively low cost. This example will be concerned with ranges of particles of the sizes likely to be available commercially. For such purposes, the sieve ranges of sands for fracturing use are assumed to be the same as stated in Example 1.

Referring to Table 1, the IOD of 400 US Sieve particles equals 0.00023 inches, and the IOD of 230 US Sieve particles equals 0.00037 inches, the average IOD of the 230–400 particles equals the average of the range, or 0.0003 inches. Since 0.0003 is smaller than 0.00031 inches, a 230–400 sieve size sand is satisfactory for the First (smallest) SFP particle.

The need for larger particles in the SFP mix depends on the size of the perforations. Round perforations 0.33 inches in diameter in an existing well will be assumed for the example. Particles in the 230–400 range will not bridge on such large perforations, so a Second particle range is needed for the SFP mix. The IOD of the Second particle must be smaller than the diameter of the First (smallest) particles. A 400 US Sieve opening is 0.0015 inches. The average IOD of 60–80 sand is about 0.0013 inches. This is smaller than the diameter of all First (smallest) particles, so 60–80 is satisfactory for the Second particle.

The 60–80 sand will not bridge on 0.33 inch perforations, so a Third particle is required. A 20–30 IOD is less than the diameter of all particles in the 60–80 range, so it is satisfactory for the Third particle in the SFP mix.

A 20–30 sand will not bridge on 0.33 inch holes so a Fourth particle is required. Particles one-third the diameter of a round perforation will bridge stably, so particles 0.111 inch in diameter are required to assure bridging. The 6–8 Sieve diameter ranges from 0.937 inches to 0.132 inches in diameter with most of the particles larger than 0.111 inch, so it will bridge on the 0.33 inch perforations. An IOD of 6–8 is smaller than all particles in the 20–30 range, so it is satisfactory for the Fourth particle of the SFP mix.

SFP mix is selected to be (by volume):

| 18% | 6 – 8 | US Sieve |
|---|---|---|
| 16% | 20 – 30 | " |
| 16% | 60 – 80 | " |
| 50% | 230 – 400 | " |
| 100% | | |

The SFP mix particle size versus cumulative percentage by weight is plotted as the dashed line on FIG. 5. This plot demonstrates the rules which determine the SFP composition. These are:

1. The formation particle diameter to be excluded must be no smaller than the IOD of the First (smallest) SFP particle.
2. The IOD of the First (smallest) SFP particle may never be larger than 0.001 inch of 25 microns.
3. The First (smallest) particle quantity must always be at least 26 percent by volume of the proppant mix.
4. The IOD of succeedingly larger particles in an SFP mix may not be larger than the particle diameters in the next smaller particle range. This can be alternatively stated: The average diameter of succeedingly larger particle ranges in a SFP mix may be no longer than 6.5 times the average diameter of the next smaller range of particles.
5. The largest particle of the SFP mix must bridge on the pipe perforation.

The percentages of each particle size in a SFP mix can be varied within wide limits without destroying the ability of the mix to stimulate production. The most critical percentage is that of the First (smallest) particles. Unless there is a sufficient amount of these particles to completely fill the space between the larger particles, the proppant layer will not retain permeability. 26% is the minumum probable porosity between the larger particles of the SFP mix, so this is the minimum quantity, by volume, of First (smallest) particles in a SFP mix. Performance of the mix improves as the amount of First (smallest) particle is increased up to the point that perforation bridging capability fails, so First (smallest) amount is usually in the 45% to 75% range, by volume. The First (smallest) particle is the most common one on a volumetric basis. Its characteristics dominate the performance of the SFP mix including openings between its particles and the permeability of the mix. Changing of size or quantity of the First (smallest) particle changes the SFP performance. Change of the size of the larger particles or their relative amounts does not affect the mix until the wedging limits are violated or bridging at the perforation fails to occur.

The reason for repeating the relationships which affect SFP performance is to emphasize that there may be more than one satisfactory mix which will stimulate production from a particular formation.

In an actual field application, factors such as fluid viscosity and cost of a future fracture treatment will have a bearing upon the size of formation particles to be excluded. It is even possible that the largest SFP IOD of 0.001 inch would be selected for some applications. In Example 2, use of the largest SFP IOD of 0.001 inch would positively exclude only 95.7 percent by weight of the formation particles. Risk of damage to the 0.001 inch IOD proppant pack would be substantial, so the smaller IOD selected for the mix will be superior for this formation.

Stimulation of the formation of FIG. 5 with a hydraulic fracture propped with the SFP mix calculated in this example can be determined by use of the graph in FIG. 3. The evaluation requires a variety of input parameters. These values are assumed as follows:

$KE_F$ = Proppant layer of permeability, Darcys
$KE_H$ = Formation effective horizontal permeability, millidarcys = 0.05
W = Average proppant layer width, feet = 0.1
$J_F$ = Productivity index aftr fracturing (to be calculated)
J = Productivity index before fracturing = 22 barrels/day
Y = Well spacing, acres = 10
re = Drainage radius, feet = 330
rw = Well bore radius, feet = 0.5

Permeability of mixes containing two or more particles must be corrected for the presence of the larger particles. From FIG. 4 permeability of 230–400 US Sieve sand is about 1.1 Darcys.

Laboratory tests show that an addition of 50% of larger particles will reduce the permeability of the mix to about 70% of the pure small sand. Permeability of the SFP mix is therefore estimated to be 0.77 Darcys. Stimulation from a nearly vertical feature of 80 feet in radius is assumed: this equals 24% fracture penetration. Substitution of all of these values in FIG. 3 allows $J_F$ production after fracturing, to be calculated.

$J_F$ = 55 barrels/day

So the SFP treatment should increase production from 22 barrels/day to 55 barrels/day.

TABLE I

| US Sieve Number | US Sieve Opening | | Intergrain Opening Diameter (IOD) Defined as Sieve Opening ÷ 6.464 | |
|---|---|---|---|---|
| | Inches | Microns | Inches | Microns |
| 2½ | 0.315 | 8000 | | |
| 3 | 0.265 | 6720 | 0.0408 | |

TABLE I-continued

| US Sieve Number | US Sieve Opening | | Intergrain Opening Diameter (IOD) Defined as Sieve Opening ÷ 6.464 | |
|---|---|---|---|---|
| | Inches | Microns | Inches | Microns |
| 3½ | 0.223 | 5660 | 0.0345 | 876 |
| 4 | 0.187 | 4760 | 0.0289 | 736 |
| 5 | 0.157 | 4000 | 0.0243 | 619 |
| 6 | 0.132 | 3360 | 0.0204 | 520 |
| 7 | 0.111 | 2830 | 0.0172 | 438 |
| 8 | 0.0937 | 2380 | 0.0145 | 368 |
| 10 | 0.0787 | 2000 | 0.0122 | 309 |
| 12 | 0.0661 | 1680 | 0.0102 | 260 |
| 14 | 0.0555 | 1410 | 0.0086 | 218 |
| 16 | 0.0469 | 1190 | 0.0073 | 184 |
| 18 | 0.0394 | 1000 | 0.0061 | 155 |
| 20 | 0.0331 | 840 | 0.0051 | 130 |
| 25 | 0.0280 | 710 | 0.0043 | 110 |
| 30 | 0.0232 | 590 | 0.0036 | 91 |
| 35 | 0.0197 | 500 | 0.0030 | 77 |
| 40 | 0.0165 | 420 | 0.0026 | 65 |
| 45 | 0.0138 | 350 | 0.0021 | 54 |
| 50 | 0.0117 | 300 | 0.0018 | 46 |
| 60 | 0.0098 | 250 | 0.0015 | 39 |
| 70 | 0.0083 | 210 | 0.0013 | 32 |
| 80 | 0.0070 | 177 | 0.0011 | 27 |
| 100 | 0.0059 | 149 | 0.00091 | 23 |
| 120 | 0.0049 | 125 | 0.00076 | 19 |
| 140 | 0.0041 | 105 | 0.00063 | 16 |
| 170 | 0.0035 | 88 | 0.00054 | 14 |
| 200 | 0.0029 | 74 | 0.00045 | 11 |
| 230 | 0.0024 | 62 | 0.00037 | 9.6 |
| 270 | 0.0021 | 53 | 0.00032 | 8.2 |
| 325 | 0.0017 | 44 | 0.00026 | 6.8 |
| 400 | 0.0015 | 37 | 0.00023 | 5.7 |

I claim:
1. The method of making a screen fracture proppant containing particles capable of retaining high operating permeability when utilized in specific geological and soil formations, which comprises the steps of:
   a. making a sieve analysis of the material of the specific formation to determine the diameter size measurement of the smallest particle thereof which is to be prevented from entering the openings of the proppant; and
   b. thereafter using as the proppant material a granular particulate having a diameter size measurement corresponding approximately to the diameter size measurement of said smallest particle of the formation multiplied by a factor no greater than 6.5.

2. The method according to claim 1, in which the granular particulate of the proppant has a diameter size measurement such that the interparticle openings produce a wedging action to prevent entry of substantially 99 percent of the formation particles, as determined by weight analysis, and to thereby induce bridging to prevent entry of all the formation particles.

3. The method of making a screen fracture proppant, for use between a medium having openings such as perforated pipe and the like, and a surrounding geological or soil formation, consisting of an intimate mix of a plurality of particle sizes which includes both large and small particles, which comprises the steps of:
   a. selecting a first particulate material in which the size of the particle is such that it will prevent passage of a predetermined small size formation particle;
   b. selecting a second particulate material in which the size of the interparticle openings is such that if the first particulate material (12) will bridge on said openings; and
   c. thereafter combining the first particulate material and the second particulate material in such proportion that the first comprises at least 26%, by volume, of the total mix and completely fills the interparticle openings between the particles of the second material.

4. The method according to claim 3, wherein the particles in step (a) have a diameter size measurement corresponding approximately to the diameter size measurement of the smallest particle by sieve analysis of the formation material that is to be prevented from entering the proppant multiplied by a factor no greater than 6.5.

5. The method of preventing entry of substantially all earth formation particles larger than a specifically selected size from entering the openings between the particles of a proppant layer which has been deposited in said formation around a preferred well pipe by a hydraulic fracturing operation, comprising the steps of: using an intimate mixture of particles consisting of at least two groups of particles having relatively narrow size ranges, the particles of one group being no greater than 6.5 times the diameter of the formation particle to be excluded and being present in an amount sufficient to completely fill the openings between the particles of the other group and in no event being less than 26 percent, by volume, of all the proppant particles.

6. The method according to claim 5, in which the particle size of said other group and each successive group of larger particles are each substantially 6.5 times the size of the particles of the preceding group, and the particles of the last group of the mix and sized to encourage bridging and wedging on the pipe perforations of the well.

7. The method according to claim 6, in which the interparticle openings between the smallest particles of the intimate mix are not greater than 0.001 inch or 25 microns.

* * * * *